US012178347B2

(12) United States Patent
Bussert et al.

(10) Patent No.: US 12,178,347 B2
(45) Date of Patent: Dec. 31, 2024

(54) THERAPEUTIC CUSHIONS AND SYSTEMS FOR USING THE SAME

(71) Applicant: Bussert Medical, Inc., Nashville, IN (US)

(72) Inventors: Jessica Bussert, Nashville, IN (US); Jacob Flagle, New Palestine, IN (US)

(73) Assignee: BUSSERT MEDICAL, INC., Nashville, IN (US)

(*) Notice: Subject to any disclaimer, the term of this patent is extended or adjusted under 35 U.S.C. 154(b) by 424 days.

(21) Appl. No.: 17/743,927

(22) Filed: May 13, 2022

(65) Prior Publication Data

US 2022/0361692 A1 Nov. 17, 2022

Related U.S. Application Data

(60) Provisional application No. 63/188,080, filed on May 13, 2021.

(51) Int. Cl.

*A47G 9/10* (2006.01)
*A61G 5/10* (2006.01)
*A61G 7/057* (2006.01)

(52) U.S. Cl.

CPC ....... *A47G 9/1027* (2013.01); *A61G 7/05776* (2013.01); *A61G 7/05784* (2016.11); *A61G 5/1045* (2016.11)

(58) Field of Classification Search

CPC ............ A61G 7/05776; A61G 7/05784; A61G 5/1045; A61H 9/0078; A47C 27/082; A47C 27/10; A47C 27/083; A47C 7/142

See application file for complete search history.

(56) References Cited

U.S. PATENT DOCUMENTS

| | | | | |
|---|---|---|---|---|
| 1,772,310 A * | 8/1930 | Hart | A61G 7/001 | 91/40 |
| 3,935,690 A | 2/1976 | Lea et al. | | |
| 4,005,236 A * | 1/1977 | Graebe | B29D 22/02 | 428/72 |
| 4,197,837 A * | 4/1980 | Tringali | A61G 7/05776 | 601/149 |
| 4,698,864 A * | 10/1987 | Graebe | A47C 27/10 | 297/DIG. 3 |

(Continued)

FOREIGN PATENT DOCUMENTS

| | | | |
|---|---|---|---|
| EP | 0878150 A2 * | 11/1998 | A47C 27/082 |
| WO | WO-2019183502 A1 * | 9/2019 | A47C 27/082 |

*Primary Examiner* — Eric J Kurilla

(74) *Attorney, Agent, or Firm* — Brannon Sowers & Cracraft PC

(57) ABSTRACT

Therapeutic cushions having a plurality of inflatable columnar cells, pumping mechanism, and a manifold or valve system for moving a fluid between the pumping mechanism and the inflatable columnar cells. The inflatable columnar cells are constructed such that inflation and deflation of the cells cause vertical expansion/contraction of the cells with limited lateral expansion/contraction. The manifold or the valve system connect the pumping mechanism with the inflatable columnar cells such that a plurality of zones are created. A valve assembly can include a plurality of valves and is adjustable among at least three valve configurations to vary fluid connections to the inflatable columnar cells to produce rearwardly advancing waves. A venting manifold may vent air from the cells between the cushions.

14 Claims, 9 Drawing Sheets

(56) References Cited

U.S. PATENT DOCUMENTS 5,052,068 A * 10/1991 Graebe .................. A47C 27/10 297/452.41
5,109,560 A * 5/1992 Uetake ............... A61G 7/05784 5/713
5,117,518 A * 6/1992 Schild ................ A61G 7/05776 5/713
5,193,237 A * 3/1993 Holdredge ........... A61G 5/1043 297/DIG. 8
5,267,364 A 12/1993 Volk
5,502,855 A * 4/1996 Graebe ................ A61G 5/1045 5/710
5,561,875 A * 10/1996 Graebe .............. A61G 7/05715 297/180.13
5,584,085 A 12/1996 Banko
5,956,787 A * 9/1999 James ................ A61G 7/05784 5/713
6,691,355 B1 * 2/2004 Liu .................... A61G 7/05784 5/655.5
7,171,711 B2 2/2007 Gowda
7,392,557 B1 7/2008 Kohlman
7,441,294 B2 10/2008 Mossbeck
7,454,809 B2 11/2008 Gowda
7,945,979 B1 * 5/2011 Lin ...................... A47C 21/044 5/652.2
8,533,879 B1 9/2013 Taylor
8,875,331 B2 11/2014 Taylor
9,408,477 B1 8/2016 Robinson
11,020,299 B2 6/2021 Gowda
11,191,367 B2 12/2021 Arzanpour
11,191,687 B2 12/2021 Sachdev
11,375,824 B2 7/2022 Bussert
11,530,045 B2 12/2022 Aviv
11,540,959 B1 1/2023 Kohlman
11,679,047 B2 6/2023 Wijesundara
2003/0159219 A1 8/2003 Harrison et al.
2004/0068801 A1 * 4/2004 Wilkinson ........... A47C 27/083 5/713
2005/0091752 A1 5/2005 Gowda
2005/0097674 A1 * 5/2005 Mileti ................ A61G 7/05776 5/710
2006/0010607 A1 * 1/2006 Schneider ............. F16K 15/147 5/713
2007/0056112 A1 * 3/2007 Graebe .................... A47C 4/54 5/655.3
2007/0163053 A1 7/2007 Gowda
2008/0172797 A1 7/2008 Mossbeck
2014/0026327 A1 1/2014 Taylor
2014/0223665 A1 * 8/2014 Chapin .................. A47C 27/10 5/710
2015/0238022 A1 8/2015 Chapin
2016/0317370 A1 11/2016 Evans et al.
2017/0056264 A1 * 3/2017 Chapin ................ A47C 27/082
2017/0128298 A1 5/2017 Gowda
2019/0183257 A1 6/2019 Arzanpour
2019/0350786 A1 11/2019 Sachdev
2021/0059426 A1 3/2021 Bussert
2021/0113402 A1 4/2021 Wijesundara
2021/0322239 A1 10/2021 Squitieri
2021/0322240 A1 10/2021 Squitieri
2021/0361501 A1 11/2021 Squitieri
2022/0031539 A1 2/2022 Peyton
2022/0048632 A1 2/2022 Aviv
2022/0236131 A1 7/2022 Clemente
2022/0296000 A1 9/2022 Bussert
2022/0361692 A1 11/2022 Bussert
2023/0174238 A1 6/2023 Aviv

* cited by examiner

THERAPEUTIC CUSHIONS AND SYSTEMS FOR USING THE SAME

RELATED APPLICATIONS

This application is related to U.S. Provisional Patent Application No. 63/188,080 filed on May 13, 2021, titled "Therapeutic Cushions and Systems for Using the Same" which is incorporated herein by reference.

TECHNICAL FIELD

The present disclosure relates generally to a therapeutic cushions, and more particularly to therapeutic cushions structured and controlled to produce advancing waves, for enhanced comfort and massaging action or to assist the body's natural blood pumping action, as well as venting systems for cooling and drying users.

BACKGROUND

U.S. Pat. No. 6,782,573 to Odderson is directed to a Body Supporting, Serial Inflating Seat. In Odderson, inflatable bladders are inflated one after another in series to purportedly help circulate blood in the legs of a user. While Odderson might have certain applications, there is ample room for alternative strategies and improvements in this field.

SUMMARY OF THE INVENTION

In one aspect, a therapeutic cushion system including a cushion body having a lower surface, an upper surface, and a plurality of columnar inflatable risers disposed therebetween with the cushion body further including at least one fluid port, a fluid reservoir, and a plurality of fluid channels which fluidically connect the fluid reservoir to the plurality of columnar inflatable risers. The columnar inflatable risers are configured to each elongate in a lateral direction extending between a first lateral cushion edge and a second lateral cushion edge so as to form at least one row in a fore-aft direction between a forward cushion edge and a rear cushion edge. Optionally each columnar inflatable cell includes one or more gussets which bias inflation/deflation in a single plane.

In another aspect, a therapeutic cushion system including a cushion having a cushion body including a lower surface, and an upper user-impingement surface formed by each of a plurality of inflatable risers. The therapeutic cushion system further including an inflation/deflation system for the cushion including a manifold having a plurality of inflation ports, a plurality of deflation ports, and a plurality of electrically actuated valves each movable between a first valve configuration and a second valve configuration as well as a plurality of inlet check valves each movable from a closed position, to an open position to admit a flow of inflation fluid from a pump to one of the inflation ports. Each of the plurality of electrically actuated valves is movable between a first valve configuration, where one of the plurality of inflatable risers is fluidly connected to one of the plurality of inflation ports and blocked from one of the plurality of deflation ports, and a second valve configuration where the one of the plurality of inflatable risers is fluidly connected to the respective one of the plurality of deflation ports, and is biased toward the first valve configuration In still another aspect, a therapeutic cushion system includes a cushion body having a lower surface, and an upper surface formed by a plurality of columnar inflatable risers, and a vent for venting expelled air among the plurality of inflatable risers.

DETAILED DESCRIPTION

Figure 1:
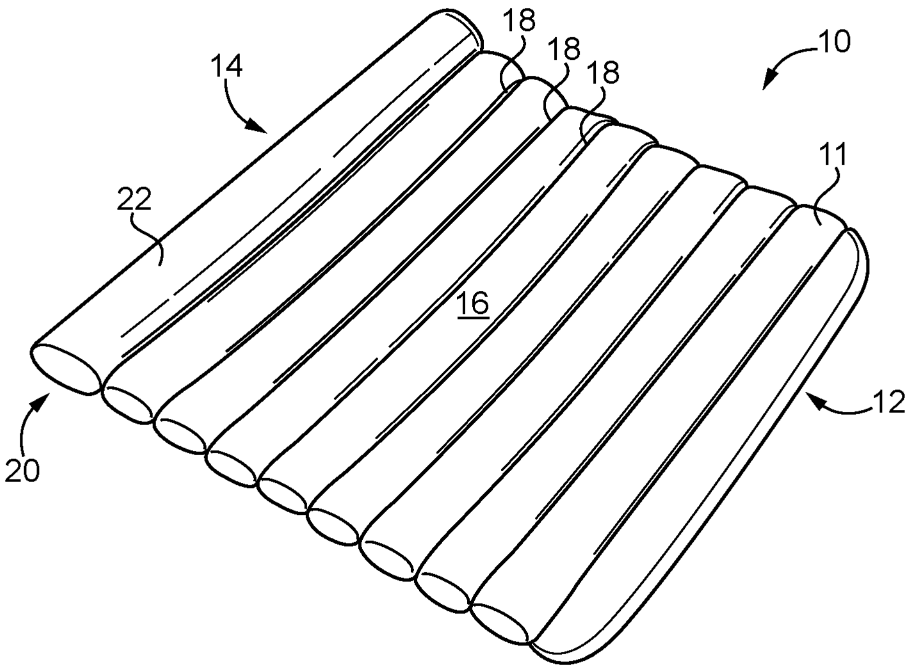
FIG. 1 is a perspective view of a cushion system according to one embodiment in a use configuration.

Referring to the drawings, there are shown inflatable therapeutic cushions according to several embodiments. Although described herein in the singular, the present description will be understood to refer generally to all embodiments except where otherwise indicated. Discussion herein of features or functionality of any one embodiment disclosed herein should be understood by way of analogy to refer to features or functionality of any other embodiment except where otherwise indicated or apparent from the context.

Referring to FIG. 1 there is shown a therapeutic seat cushion/seat cushion system 10 (hereinafter "cushion 10") according to one embodiment. Cushion 10 is shown as it might appear in a use configuration to be sat upon by a user. Cushion 10 includes a cover 11, formed for example from a fabric, having a front or forward seat cushion edge 12 and a back or rear seat cushion edge 14. A rear receptacle 22 adjacent to rear edge 14 has a cavity formed therein that contains various electronics and other components, as further discussed herein. Creases or grooves 18 formed in cover 11 extend widthwise and are generally structured to fit about inflatable cells (not visible in FIG. 1) that are within cover 11, and are interspersed among the inflatable cells. Grooves 18 form fold lines along which cover 11 is folded when rolled-up for storage and/or packaged for retail. In a practical implementation strategy, inflatable cells in cushion 10 may be arranged in a right side or right-hand series and a left side or left hand series, with the inflatable cells arranged in series between front edge 12 and rear edge 14. In other instances, a single series of inflatable cells may be provided, approximately as shown. Also visible in FIG. 1 is a plug or port 20, such as a Universal Services Bus (USB) port, for connecting cushion 10 to a power supply and/or data communication link. It will be appreciated that cushion 10 may be used in a passenger vehicle or institutional setting, and the prevalence of USB ports for electric power in modern passenger vehicles makes USB connectivity an advantageous feature. A conventional AC connector plug could additionally or alternatively be used, or some other electrical power supply connector or interface. As will be further apparent from the following description, cushion 10 may be equipped with internal components and computer control hardware and software to enable the inflatable cells to be inflated and deflated in a manner that produces rearwardly advancing pumping waves to assist in pumping blood from a user's legs back toward the heart and lungs. The manner of inflation and deflation can be customizable on the basis of user preference, or to carry out prescribed therapeutic treatments for instance.

Figure 2:
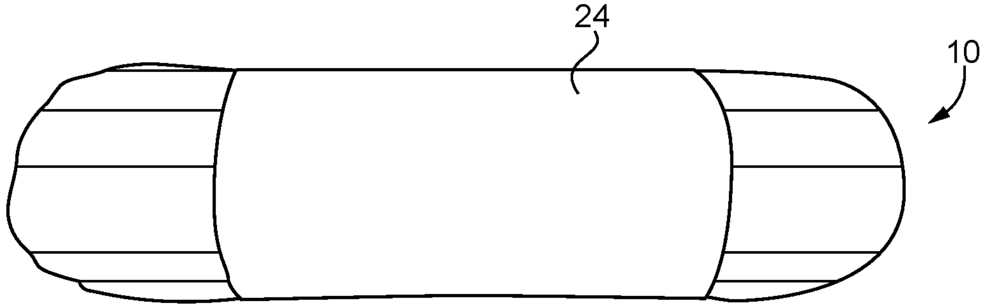
FIG. 2 is a diagrammatic view of a packaged cushion system in a rolled-up configuration.

Referring to FIG. 2 there is shown cushion 10 as it might appear in a rolled-up configuration and retained within the rolled-up configuration in a package 24 such as a packaging tube, wrap, or the like. The inflatable cells may be arranged in series as noted above, extending widthwise across cushion 10. Together with creases/grooves 18 the arrangement of inflatable cells makes cushion 10 well suited to rolling up and packaging when deflated such as for storage or commercial display and retail sale.

Figure 3:
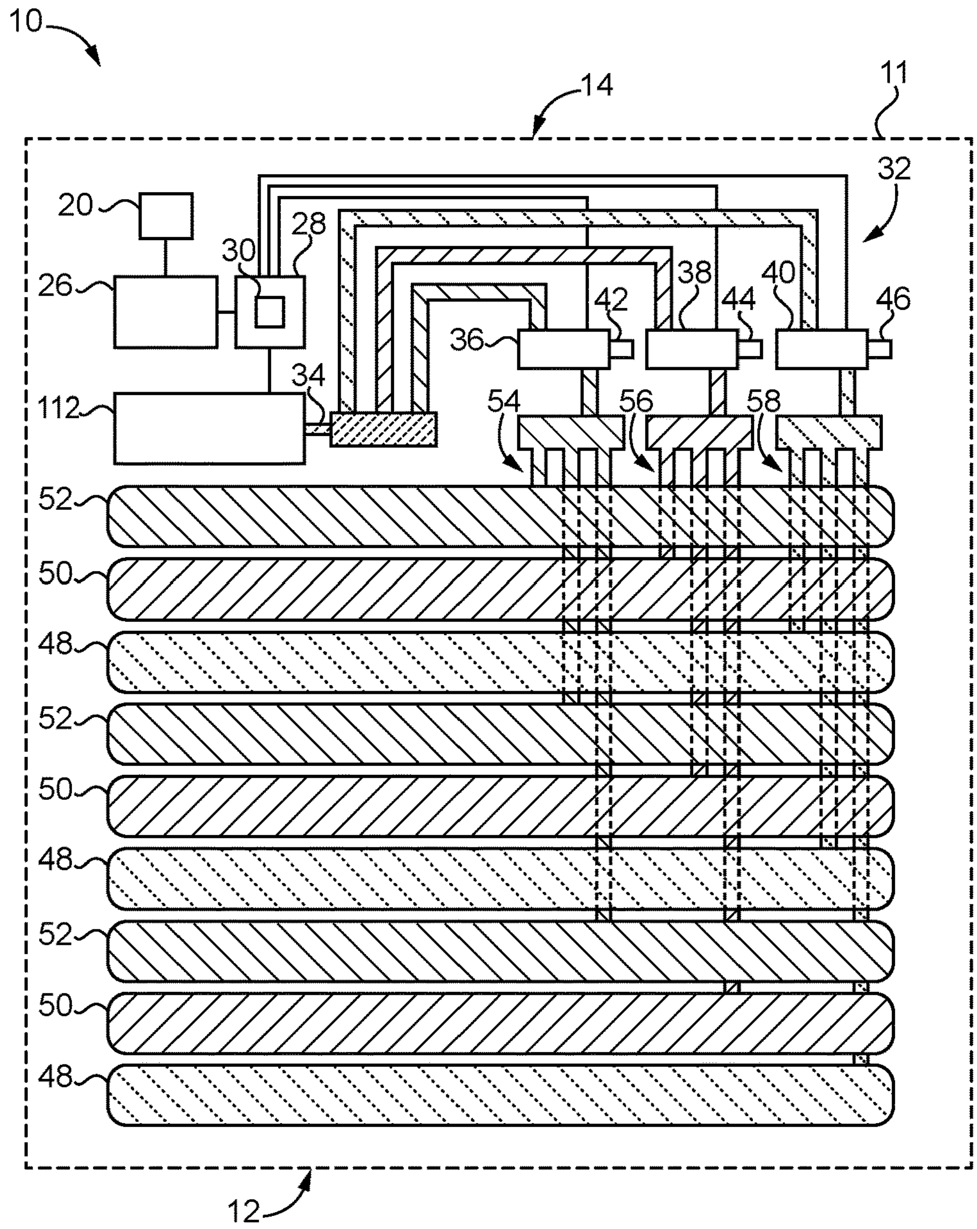
FIG. 3 is a schematic illustration of a cushion system, according to one embodiment.

Turning now to FIG. 3, there is shown a schematic view of cushion 10 illustrating internal components. It can be seen that a battery 26 is connected with plug 20 for charging. Control circuitry 28, including an electronic control unit 30 such as a microprocessor or microcontroller, is coupled with battery 26 and also with a pumping mechanism 112. Pumping mechanism 112 can include an air pump in one embodiment, although the present disclosure is not thereby limited and other inflation fluids, as well as various pump designs or other sources of fluids for fluid flow could be used. A source of pressurized fluid for actuating cushion 10 could be external, for instance. In such an embodiment fluid inlet 34 could be positioned externally of cushion 10. At least one fluid inlet 34 connects pumping mechanism 112 (hereinafter "pump 112") with a manifold or manifold system 32. An electrically actuated valve assembly is positioned fluidly between fluid inlet 34 and a plurality of inflatable cells 48, 50, and 52, the arrangement of which is further described herein. The electrically actuated valve assembly can include a plurality of valve mechanisms 36, 38, and 40, which can include slide-type hydraulic valves such as spool valves, or poppet valves, for example, each of which is equipped with an electrical actuator that varies energy state responsive to a control signal from electronic control unit 30. The valve assembly can be adjustable among a plurality of different valve configurations, including at least three valve configurations, to vary fluid connections between inflation inlet 34 and inflatable cells 48, 50, and 52, and also between at least one deflation outlet 42, 44, and 46 and inflatable cells 48, 50, and 52, the significance of which is further discussed below.

For convenience of distinguishing between different cells, it will be noted inflatable cells 48 are designated as colored red (with a first shading pattern in the drawings), inflatable cells 50 are designated as colored green (with a second shading pattern in the drawings), and inflatable cells 52 are designated as colored blue (with a third shading pattern in the drawings) herein. Fluid conduits 54 extend between valve mechanism 36 and the blue inflatable cells 52. Fluid conduits 56 extend between valve mechanism 38 and green inflatable cells 50, whereas fluid conduits 58 extend between valve mechanism 40 and red inflatable cells 48. In one implementation all of inflatable cells 48, 50, and 52 as well as conduits 54, 56, and 58 can be formed by radiofrequency (RF) welding together two sheets of plastic or other suitable polymeric material to selectively create joints or seams. It will be appreciated that other strategies for forming inflatable cells and suitable plumbing are possible.

Figure 4:
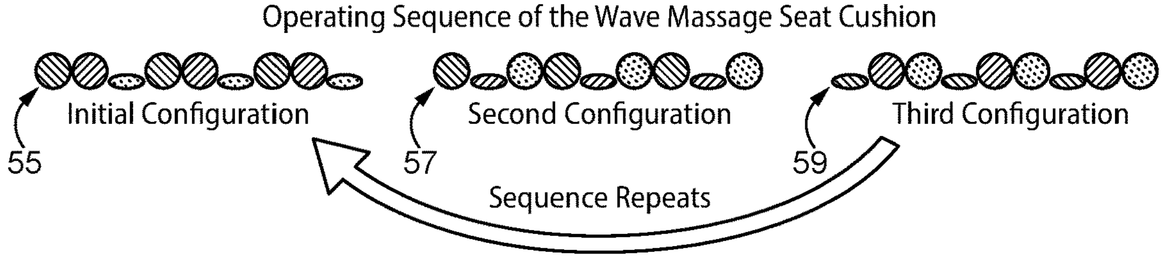
FIG. 4 is a concept diagram illustrating an operating sequence of a cushion system, according to one embodiment.

As noted above the valve assembly can provide selective connections at any one time of some of the inflatable cells to inflation inlet 34 and some of the inflatable cells to deflation outlet(s) 42, 44, and 46. FIG. 4 sets forth an example inflation/deflation sequence that includes three or more inflation configurations of inflatable cells 48, 50, 52. The number of inflation configurations may be based on the number of inflatable cell groups within cushion 10. For example, cushion 10 of the present embodiment includes three groups of inflatable cells that can be inflated or deflated to form three distinct inflation configurations: an initial configuration 55, a second configuration 57, and a third configuration 59. It will be appreciated, however, that there may not always be a 1:1 correlation between the number of inflatable cell groups and the number of inflation configurations. Generally, as the number of inflatable cell groups increases, so does the number of possible inflation configurations. By selectively connecting, for instance, red inflatable cells 48 to deflation outlet 46 while green inflatable cells 50 and blue inflatable cells 52 are connected to inflation inlet 34 (i.e., initial configuration 55), then connecting green inflatable cells 50 to deflation outlet 44 while blue inflatable cells 52 and red inflatable cells 48 are connected to inflation inlet 34 (i.e., second configuration 57), and then connecting blue inflatable cells 52 to deflation outlet 42 while red inflatable cells 48 and green inflatable cells 50 are connected to inflation inlet 34 (i.e., third configuration 59), rearwardly advancing pumping waves can be produced. Another way to understand the principle is that some of the inflatable cells are connected to incoming inflation fluid (typically air) while others are connected to exhaust/deflation, and then the arrangement/connections are varied to enable the wave(s) to push or propagate towards the rear edge of cushion 10. In this general way a pumping action can be generated to help push blood through a user's legs (or any body portion of interest in contact with cushion 10) towards the heart and lungs. It can be noted from FIG. 4 that selective inflation/deflation can produce rearwardly advancing low pressure zones (the deflated cells). It can also be noted that typically no two deflated cells are adjacent at any one time. It is further noted that in some configurations, additional inflation states are contemplated for cells beyond the binary inflated and deflated states, such as ⅓ inflated, ½ inflated, ⅔ inflated, and the like, expanding options for configurations. The rear seat cushion edge is to the left in the FIG. 4 illustrations.

Figure 5:
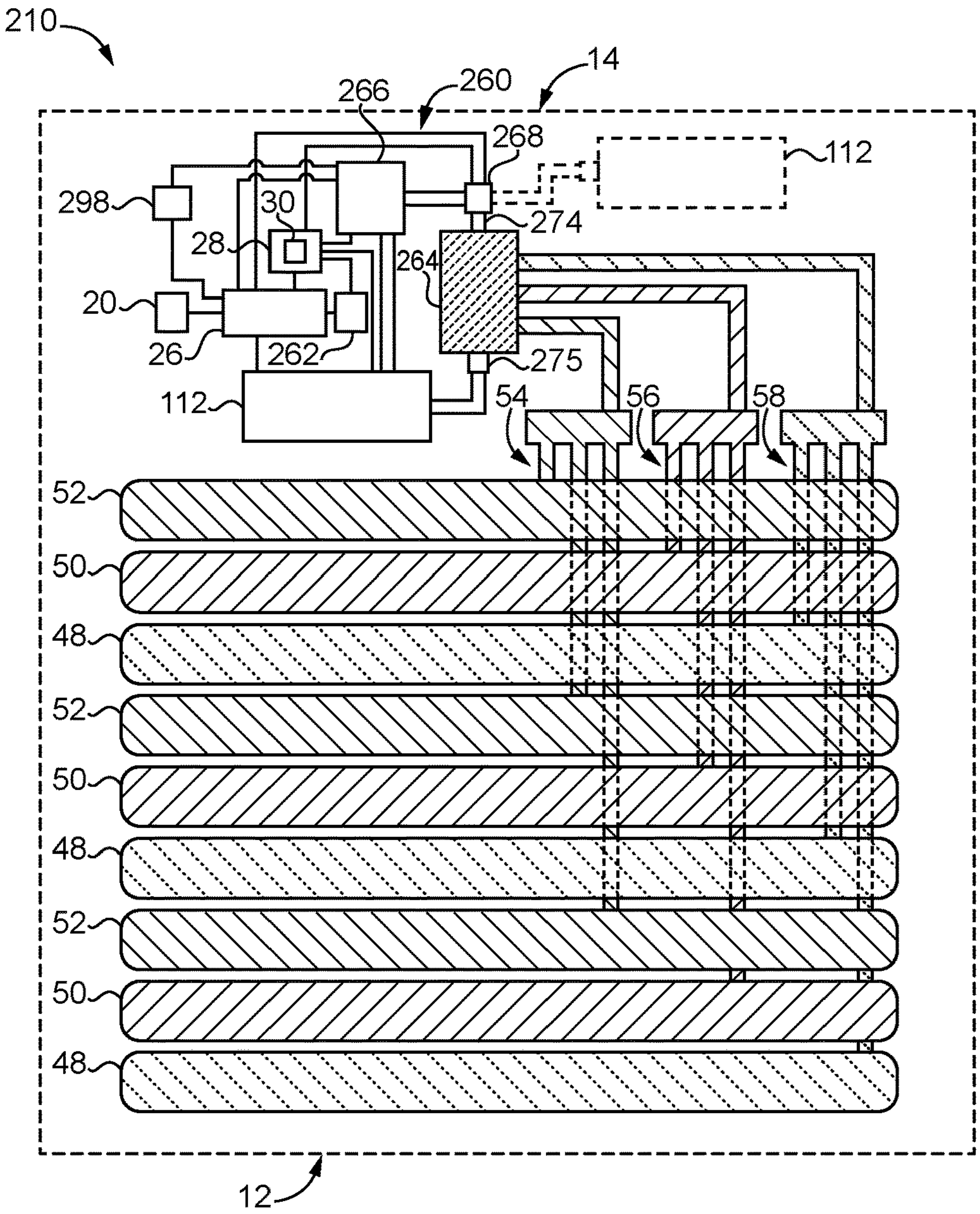
FIG. 5 is a schematic illustration of a cushion system, according to a second embodiment.

In some embodiments, a cushion according to the present disclosure, such as cushion 210 in FIG. 5, might include an air pressure monitoring system structured to monitor an air pressure parameter indicative of air pressure within one or more of inflatable cells 48, 50, 52, in conduits 54, 56, 58, or in another component of cushion 210. The air pressure monitoring system may include one or more sensors 298 communicatively coupled with electronic control unit 30 and positioned within or next to sitting surface 16. Sensor 298 can include any suitable pressure sensor, such as a capacitive, inductive, resistive, or other electronic sensor that changes its electrical or electromagnetic energy state in response to a change to, application of, or removal of, physical pressure upon a sensing element. Pressure sensor 298 could include an electrical switch having only an ON state and an OFF state in some embodiments. Electronic control unit 30 may be structured to receive data from the sensor(s) and determine, estimate, or infer the air pressure based on the received data. In other embodiments, electronic control unit 30 might be structured to determine air pressure by, for instance, measuring or determining a parameter of pumping mechanism 112, such as resistance to displacement of a pumping mechanism. The air pressure monitoring system could also detect a change in an air pressure parameter indicative of changing air pressure in one or more of inflatable cells 48, 50, 52 or analogous structures or components, and produce a signal in response. For instance, electronic control unit 30 may monitor a parameter indicative of air pressure to detect changes that might be indicative of a leak or a change in a patient's position on cushion 10, or that might indicate a patient stood up from or fell off cushion 10.

Electronic control unit 30 might also be structured to generate a signal responsive to a change in air pressure to cause pumping mechanism 112 to vary or discontinue a flow of air to inflatable cells 48, 50, 52. In other embodiments, the air pressure monitoring system might include an alarm, with electronic control unit 30 being structured to produce an alarm signal responsive to a change in air pressure or any other parameter. In still other embodiments, cushion 10 may include a wired or wireless transmitter, such as an RF, Bluetooth, or Wi-Fi transmitter coupled with circuitry 28. In such an embodiment, electronic control unit 30 may generate an alarm signal for the transmitter for transmission to a receiving device such as a mobile phone, a beeper (pager), a computer, or like device for the purpose of producing an alarm. In still other instances, the pressure parameter of interest might not necessarily be indicative of, or directly indicative of, air pressure in cushion 10, but instead include a sitting pressure of a user. For instance, pressure could be sensed in a part of cushion 10 whose pressure does not vary, or significantly vary, with inflation and deflation of the cells, but instead varies only based on the presence or absence of a person, or change in the applied weight of the person. Such an application could enable sensing the presence, absence, or body repositioning of a user in a manner analogous or complimentary to embodiments where air pressure is monitored. In still other instances, it is contemplated that sensed pressure feedback could be used for more sophisticated monitoring of patient positioning and behavior. In certain applications one or more pressure sensors can be positioned within cushion 10 and used to detect frequency and/or intensity of a user shifting his or her weight left, right, back, and the like. Logging such patterns of behavior over time is expected to elucidate trends that can be exploited or prevented in controlling and varying inflation and deflation of cushion 10 to optimize patient comfort and produce desired outcomes, such as prevention and/or treatment of pressure sores and the like. It is still further contemplated that pressure and body positioning/movement data gathered from a fleet of deployed cushions (garnered database) can enable optimized patterns of cushion inflation control to enable reduction in pressure sores and the like on a population level. Sensors 298 may be paired with the electronic controller 30 to vary treatment based on feedback. Sensors 298 may be paired with a ID code or signal unique to a particular patient to verify treatment received. In an institutional setting, it is contemplated that many cushions might be deployed to many different users, with a local communication system such as a Wi-Fi network or wired LAN, gathering data from the individual cushions as to use, efficacy, fall incidence, or other factors such as compliance with treatment regimens on a population level. It is also contemplated that cushions could be connected to a distribution system in a facility for pressurized air, or tanked air, with the cushions constructed without a resident pump at all. It is still further contemplated that treatment/use routines could be stored on a facility server, or a cloud server, and used to centrally control a fleet of cushions and/or receive and store usage data. Usage data herein could include adoption of treatment, in other words whether and/or the extent to which cushions are used, what specific patterns of inflation are adopted, or even confirmation that intended users are actually the ones using the cushions intended or controlled for their use. In an embodiment, a proximity sensor resident on a cushion could detect patient presence and/or patient identity by reading an electronically stored numerical patient identifier on a patient wristband or the like. This general concept could enable monitoring and potentially controlling dozens or even hundreds of devices in an effort to transform the health of a patient population or implement standardized treatment protocols. Each patient could have a user profile stored in a centralized database.

It will be appreciated that the valve arrangement illustrated in the attached drawings is exemplary only, and numerous alternative strategies might be successfully implemented. Analogously, while the zoned arrangement of the inflatable cells to provide a leading zone (red), a trailing zone (blue), and at least one middle zone (green) provides a practical implementation strategy, in other implementations more than three zones might be provided. It will further be appreciated that the presently disclosed strategy differs from other designs for therapeutic cushions where pressure was distributed between only two zones which, at best, provides only a back and forth motion (generating zero net fluid transport toward the heart and lungs) instead of a true pumping wave action (i.e., a peristaltic pumping action). The present disclosure can be understood to enable producing a greater number of inflated cells that follow a lesser number of deflated cells, toward the rear seat cushion edge. The FIG. 3 illustration could be modified to show three inflated cells following two deflated cells, four inflated cells following three deflated cells, six inflated following one deflated, and so on with still other combinations. A plurality of pumping waves can be produced at any time, with the number of waves typically being based on the number of repetitions in the serial, repeating arrangement of the leading, trailing, and at least one middle zone. Further still, embodiments are contemplated where an arrangement of separately controllable valves can vary the size and location of the different zones. For instance, valves could be selectively used to adjust the size of zones (size=number of cells) that are inflated and deflated to effectively vary the wavelength of the wave that is generated. Still other variations, such as those variations arising from varying the timing of the valve assembly actuation, contemplated herein relate to differences in amplitude and frequency of inflation and/or varying speed, amplitude, frequency, wavelength, and/or waveform (shape of the wave as determined by degree of inflation of cells) properties to tailor treatment parameters, and/or variations between the above-listed properties in a left series versus a right series of the inflatable cells such that a user's legs are treated differently from one another.

Referring still to FIG. 5 cushion 210 is similar to cushion 10 in many respects, but differs in that cushion 210 includes a unified valve system ("valve system") 260 for controlling a flow of air, or other inflation fluid, from pumping mechanism 112 to conduits 54, 56, 58 instead of individual valves (i.e., valves 36, 38, 40) for each conduit. Cushion 210, unlike the embodiment of cushion 10 shown in FIG. 3, also includes a wireless transmitter 262 coupled with circuitry 28 for wirelessly transmitting signals to a receiving device, such as a local server at a healthcare facility or a web server. It should be noted that like reference numerals are used to describe or denote like features across different embodiments without further explanation, it being understood that such features may be identical in construction and function to their counterparts discussed above. It should nevertheless be appreciated that no limitation is intended by way of the use of any particular reference numeral. Material differences between embodiments will be discussed herein. Absent such discussion, different embodiments should generally be understood to be alike in structure and function. Components described in connection with one embodiment may be included in other embodiments in which these components are not described or discussed. Unless expressly stated otherwise, components across embodiments having like features or functions can be understood as having like structures regardless of terminology.

Valve system 260 may include a valve assembly 264, a motor 266, and a clutch 268 coupling motor 266 with valve assembly 264. Valve assembly 264 is fluidly positioned between pumping mechanism 112 and conduits 54, 56, 58. Motor 266 might be a stepper motor coupled with battery 26 and circuitry 28, and structured to vary an angular position of a valve member to selectively place pumping mechanism 112 in fluid communication with conduits 54, 56, 58. In other embodiments, valve system 260 might include a different type of motor or might include two or more motors. Motor 266 may also be structured to induce or cause a pumping action within pumping mechanism 112 such that air is pumped to valve assembly 264. Clutch 268 may be positioned between valve member 270 and motor 266 such that rotation of motor 266 can be selectively transferred to valve member 270 to vary its angular position while being able to also rotate to pumping mechanism 112 as needed. In some embodiments, pumping mechanism 112 might be coupled with clutch 268, as indicated by the dashed lines in FIG. 5, on a common output shaft or shaft assembly of motor 266. Thus, a single shaft or shaft assembly can extend from motor 266 to clutch 268 and to valve assembly 264. Rotating motor 266 in a first direction operates pumping mechanism 112, whereas rotating motor 266 in the opposite direction varies angular position of valve assembly 264, with clutch 268 serving as a torque transfer device that couples rotation of motor 266 in the first direction to pumping mechanism 112 but not valve assembly 264, and couples rotation of motor 266 in the second direction to valve assembly 264, and optionally but not necessarily to pumping mechanism 112. Clutch 268 could be engaged in the second direction to rotate valve assembly 264, but disengaged in the first direction. A variety of suitable mechanical clutches or electromechanical clutches could be used. A so-called freewheeling clutch provides one practical implementation strategy. Thus, rotation of motor 266 in the first direction operates pumping mechanism 112 without changing an angular position of valve assembly 264, and rotation of motor 266 in the second direction enables adjustment of valve assembly 264. Motor 266 can be digitally controlled such that when rotated to vary a position of valve assembly 264, valve member 270 can be positioned at relatively precise angular positions to obtain different valve/fluid flow configurations for filling or partially filling cells 48, 50, 52 and controlling cushion 10 as further discussed herein. Cushion 210 may include a sensor 298 communicatively coupled with circuitry 28, such as a pressure sensor structured to monitor a parameter of conduits 54, 56, 58, or of inflatable cells 48, 50, 52 indicative of air pressure therein. Sensor 298 might be a different type of sensor in other embodiments, such as a temperature sensor or a pressure sensor structure to detect a parameter indicative of force exerted upon cushion 210.

Figure 6:
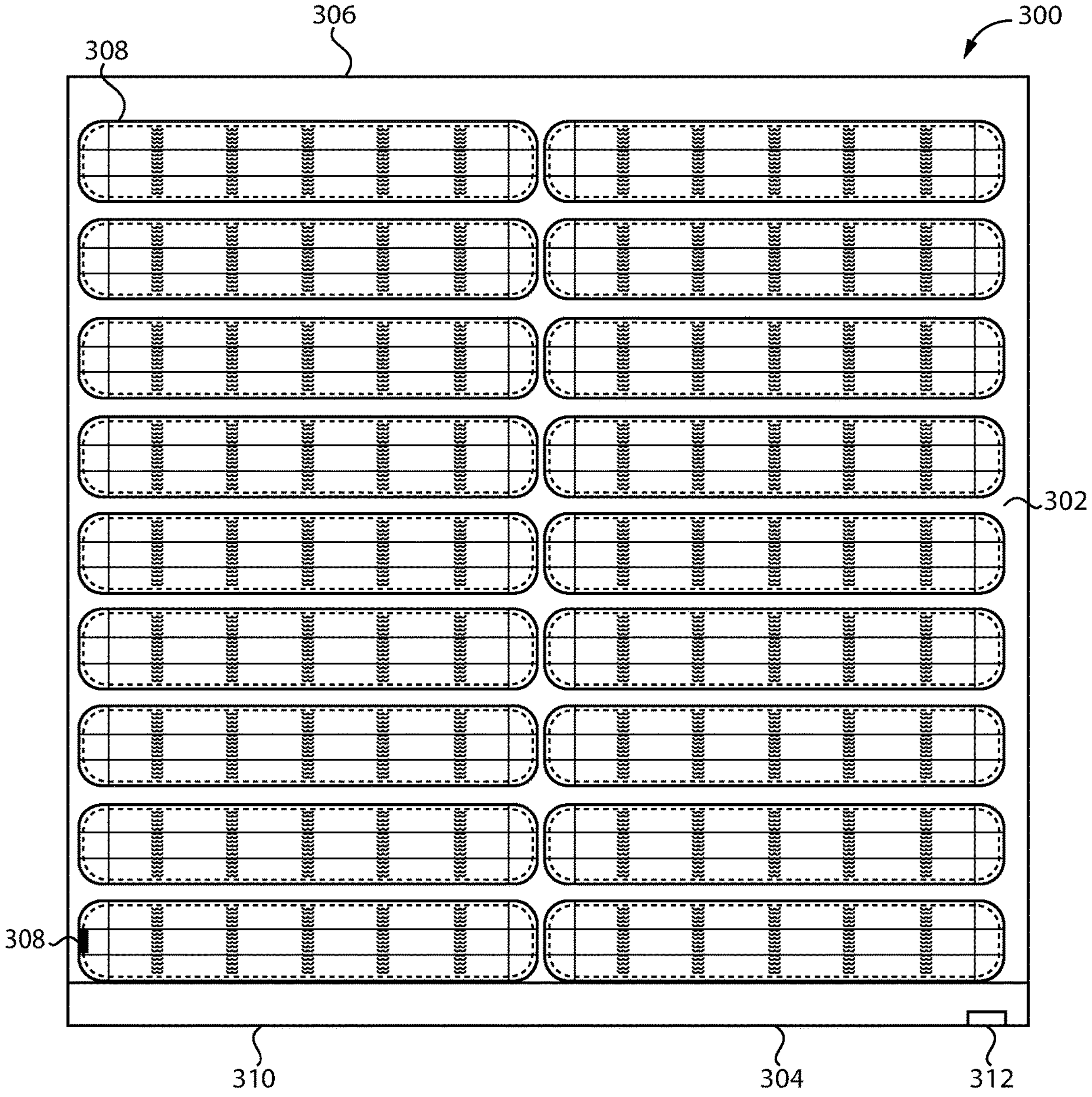
FIG. 6 is a top plan view of a cushion system according to one embodiment.
Figure 8:
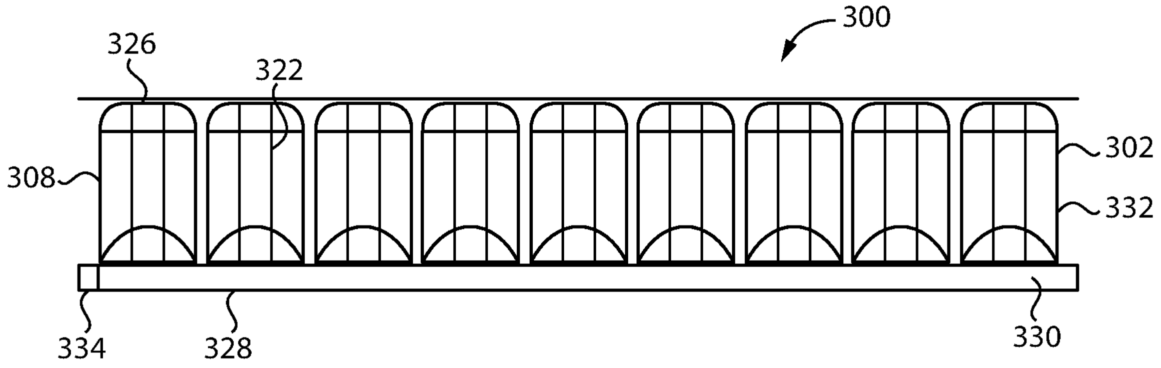
FIG. 8 is a partial cross sectional side view of a cushion system according to the embodiment shown in FIG. 6.

As seen in FIGS. 6 and 8 there is a therapeutic cushion system 300 (hereinafter "cushion 300") according to another embodiment. The cushion 300 may include a cover (not shown) made from a suitable fabric or other material. The cushion 300 has a cushion body 302 which includes a front cushion edge 306 and a rear cushion edge 304. A rear receptacle 310 adjacent to the rear cushion edge 304 has a cavity formed therein that contains various electronics and other components such as discussed previously with respect to other embodiments. A plurality of inflatable cells 308 or risers in cushion 300 may be arranged in a left/right configuration forming rows which extend from the front edge to the rear edge such as shown or in other configurations in other examples. Rear receptacle 310 further includes an access port 312 which may be a plug receptacle, USB port, or the like for connecting cushion 300 to a power supply and/or data link.

Figure 7:
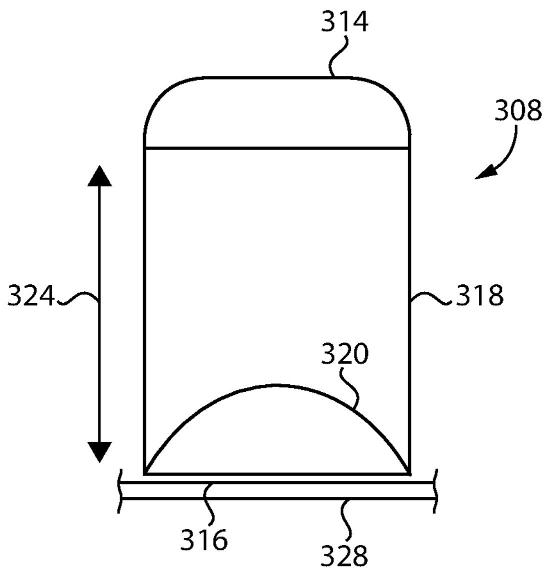
FIG. 7 is a side view of an inflatable cell according to one embodiment.

As shown in FIG. 7, inflatable cell riser 308 includes an upper or impingement surface 314 and a lower surface 316 joined by a side 318. Optionally, inflatable cell riser 308 may include one or more gussets 320, 322 to bias the cell 318 into an open/upright position. Such gussets may be internal (322) or external/formed into the side of the cell (320). Inflatable cell riser 308 is structured such that adding fluid expands/inflates the cell in an elongate direction 324 and removing fluid collapses/deflates the cell in the same direction thereby creating vertical motion with little to no lateral motion of the upper surface 314. As seen in FIG. 8, a plurality of inflatable cell risers 308 may be disposed between a cushion body base 328 and a cushion body cover 326 such as previously described, the plurality of inflatable cells 308 forming an inflation layer 332 in the cushion body. The cushion body 302 may also include a plumbing layer 330 disposed between the inflation layer 332 and the body base 328. The plumbing layer 330 optionally includes one or more fluid ports 334 formed therein. The plumbing layer 330 may also include one or more channels or passages for moving fluid between inflatable cells such as previously described and such as shown in FIGS. 9-10.

Figure 9:
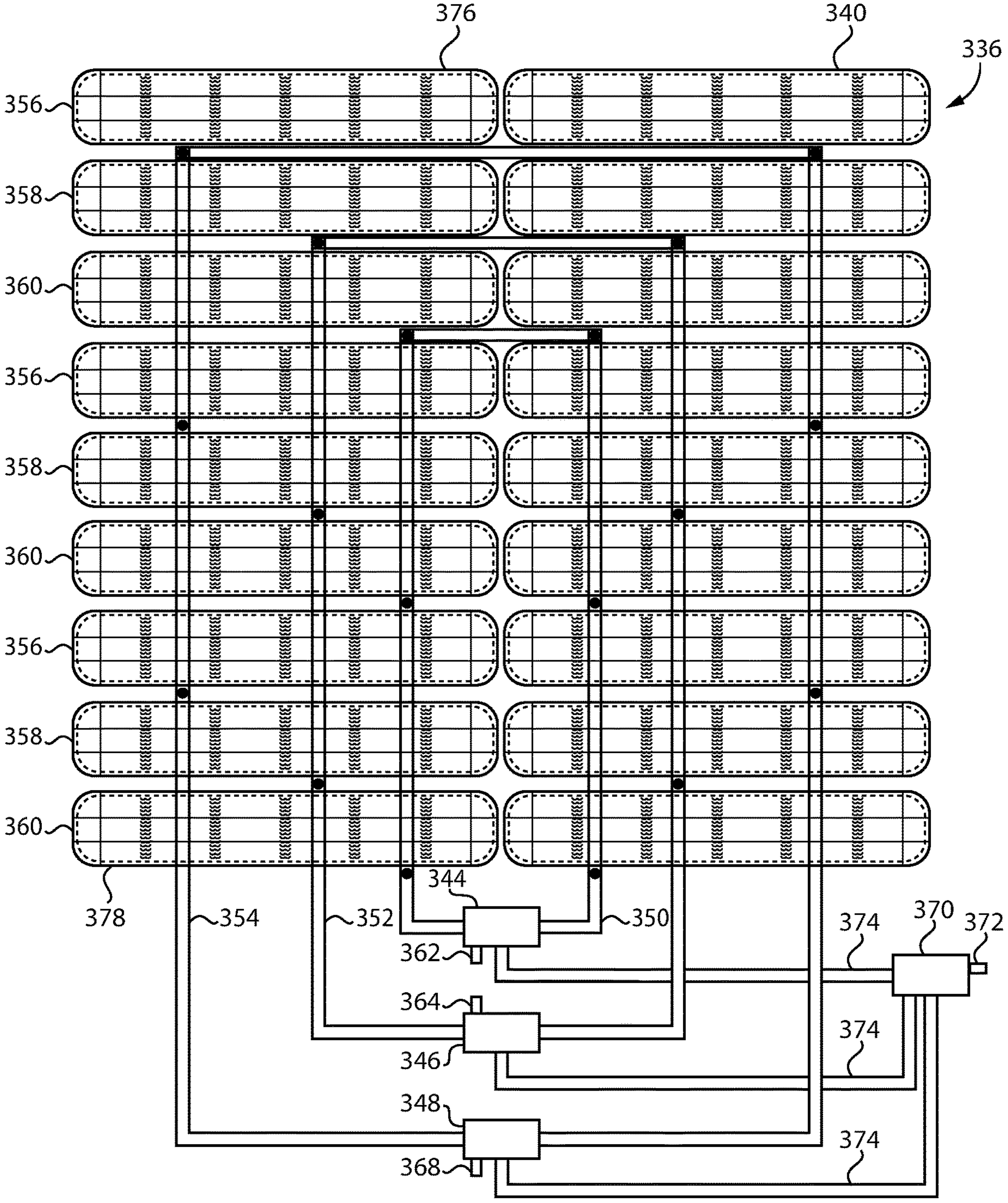
FIG. 9 is a schematic view of a cushion system according to another embodiment.
Figure 10:
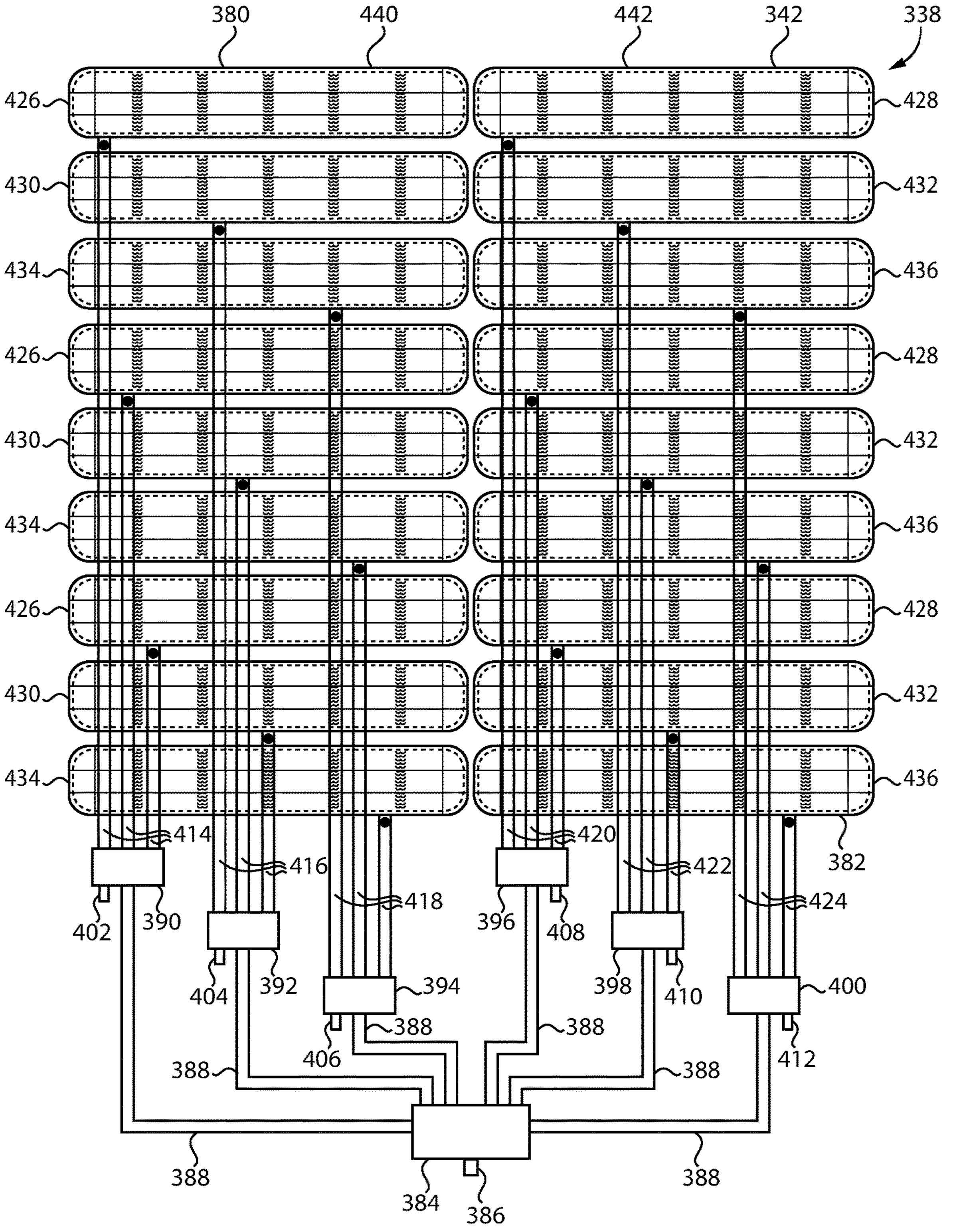
FIG. 10 is a schematic view of a cushion system according to still another embodiment.

FIGS. 9-10 show schematic views of therapeutic cushion systems 336, 338 similar to those previously described with respect to FIGS. 3 and 5 and including columnar inflatable cells 340, 342 such as shown in FIG. 7. In these particular examples the electronic components (battery, control circuitry, and the like), pumps, and valves have been omitted for the sake of clarity. It is understood that such components as shown and described with respect to the embodiments shown in FIGS. 3 and 5 may also be incorporated into the embodiments shown in FIGS. 9-10.

A therapeutic cushion system 336 having a plurality of inflatable columnar cells 340 is shown in FIG. 9. In this example a plurality of valve mechanisms 344, 346, 348 which may be slide-type hydraulic valves, spool valves, poppet valves, and the like are operationally connected to a fluid reservoir 370 by one or more channels 374 which allows fluid to pass from the reservoir 370 to the valves 344, 346, 348. Fluid reservoir 370 may include a fluid port 372 which allows fluid to be added or removed from the system. Each valve 344, 346, 348 includes a deflation outlet 362, 364, 368 and is operationally connected by a fluid channel 350, 352, 354 to a series of inflatable cells 360, 358, 356. As noted with respect to previous examples, the operation of the valves and the resulting inflation/deflation of the cells may configured in a number of ways. In one example, a wave-type operation where inflatable cells 360, 358, 356 alternate between the inflated state and the deflated state so as to produce a pattern similar to that shown and described in FIG. 4. In this particular example the columnar inflatable cells 340 are arranged in rows 356, 358, 360 disposed from the front 376 to the rear 378 of the cushion 336. In other examples the cells may be configured and arranged in other patterns.

FIG. 10 shows a therapeutic cushion system 338 having a plurality of inflatable columnar cells 342. In this example a plurality of valve mechanisms 390, 392, 394, 396, 398, 400 which may be slide-type hydraulic valves, spool valves, poppet valves, and the like are operationally connected to a fluid reservoir 384 by one or more channels 388 which allows fluid to pass from the reservoir 384 to the valves 390, 392, 394, 396, 398, 400. Fluid reservoir 384 may include a fluid port 386 which allows fluid to be added or removed from the system. In this particular example the valves 390, 392, 394, 396, 398, 400 are divided into a first group 390, 392, and 394 and a second group 396, 398, and 400. The first group is associated with a first bank 440 of columnar cells and the second group is associated with a second bank 442 of columnar cells. This configuration allows each bank of cells 440, 442 to inflate/deflate independently of one another.

Each valve 390, 392, 394, 396, 398, 400 includes a deflation outlet 402, 404, 406, 408, 410, 412 and is operationally connected by a fluid channel 414, 416, 418, 420, 422, 424 to a series of inflatable cells 426, 430, 434, 428, 432, 436. As noted with respect to previous examples, the operation of the valves and the resulting inflation/deflation of the cells may configured in a number of ways. In one example, a wave-type operation where inflatable cells 426, 430, 434, 428, 432, 436 alternate between the inflated state and the deflated state so as to produce a pattern similar to that shown and described in FIG. 4. In this particular example the columnar inflatable cells 342 are arranged in two banks 440, 442 of rows 426, 430, 434, 428, 432, 436 disposed from the front 380 to the rear 382 of the cushion 338. In other examples the cells may be configured and arranged in other patterns.

Figure 11:
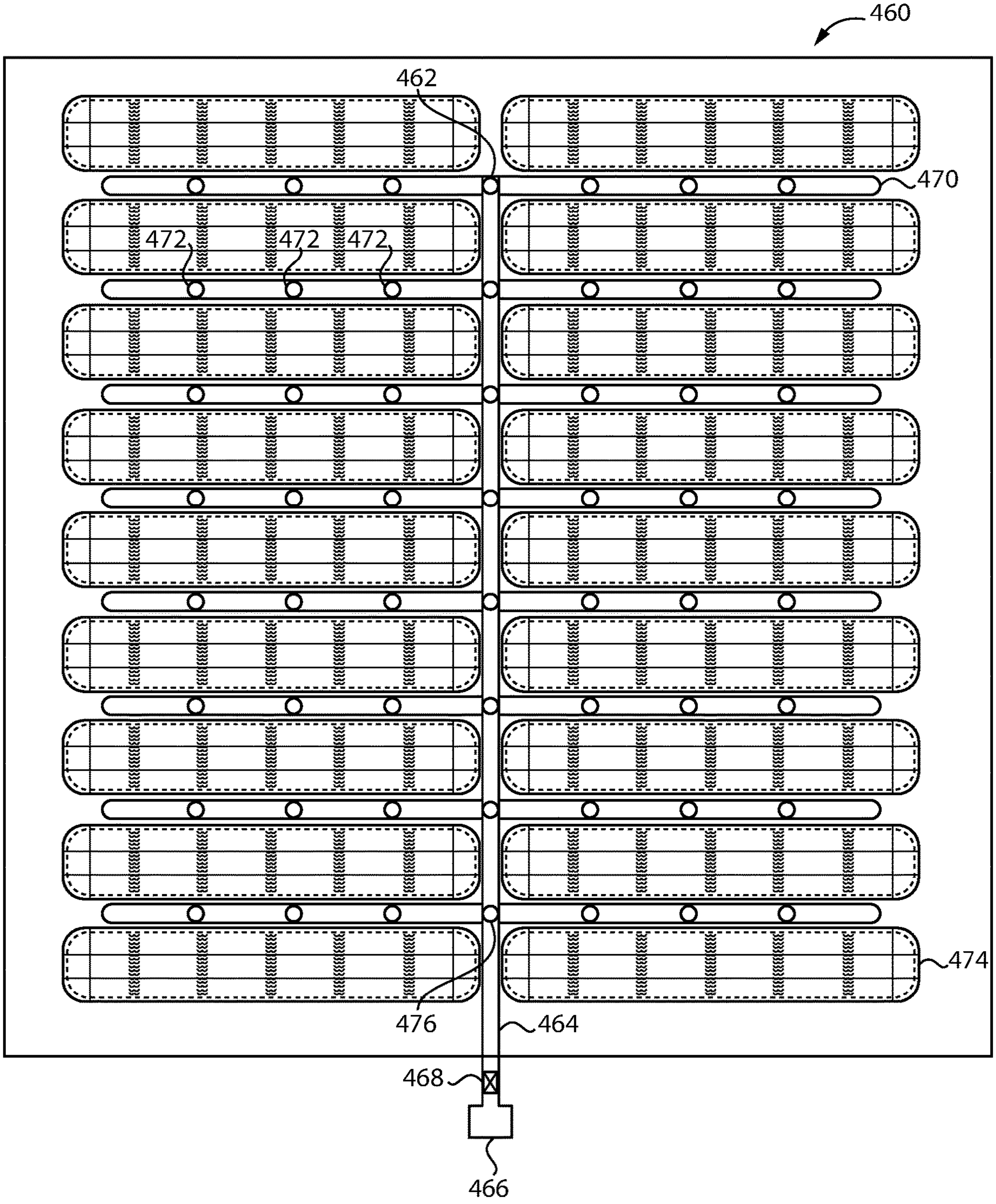
FIG. 11 is a schematic view of a cushion venting system according to one embodiment.

FIG. 11 shows a schematic view of a cushion venting system 460 according to one embodiment. The cushion venting system 460 includes a venting manifold 462 which has a main vent channel 464 fluidically connected to a plurality of venting side channels 470. In other embodiments there may be more or fewer venting side channels as desired. The main channel 464 and side channels 470 are sized and configured to run between and among the cushions 474 of a therapeutic cushion system such as those described in greater detail previously. Each of the side channels includes a plurality of vents 472 spaced along the length of the side channel. The spacing and number of vents may vary as desired, and could include a total of one vent in some embodiments. Optionally, the main channel 462 also includes a plurality of vents 476 spaced along its length. The main channel also includes a connection port 466 which allows for the venting manifold 462 to be fluidically connected to one or more deflation ports of a therapeutic cushion system such as those shown in FIGS. 9-10. Optionally, the connection port 466 further includes a check valve 468 which prevents air from traveling back into the deflation ports of the therapeutic cushion system.

When the cushion venting system 460 is in operation air to be vented from one or more cushions 474 flows through the venting manifold 462 and out the plurality of vents 472 (and/or 476) rather than simply existing the system through a deflation port such as shown in FIGS. 9-10. This configuration forces the vented air to flow between the cushions 474 and up past the body of user laying on the therapeutic cushion system thereby cooling the user and carrying away excess moisture. Optionally, valves may be disposed along the main channel 464 and/or side channels 470 to limit or direct venting air as desired. For example, if a user desired more airflow over and around their torso but less past their legs valves could be selectively closed to restrict venting air to the side channels near the legs but to allow more airflow to those side channels near the torso.

Figure 12:
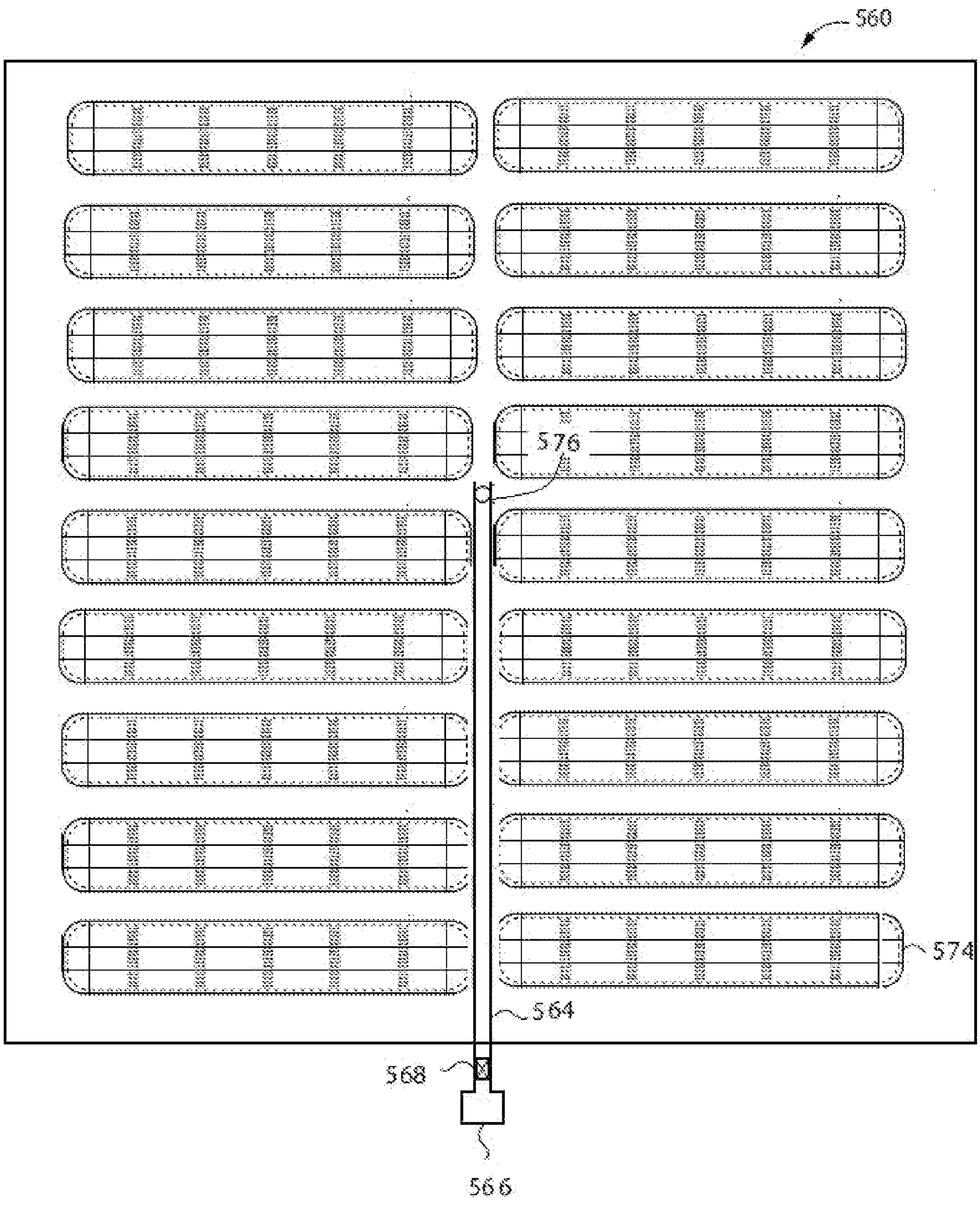
FIG. 12 is a schematic view of a cushion venting system according to another embodiment.

FIG. 12 shows a schematic view of a cushion venting system 560 according to another embodiment. The cushion venting system 560 includes a vent channel 564 without the venting side channels of the system shown in FIG. 11. The vent channel 564 includes at least one vent 576 disposed at some point along the length of the vent channel 564. The vent channel 564 is sized and configured to run between and among the cushions 574 of a therapeutic cushion system such as those described in greater detail previously. The vent channel 564 also includes a connection port 566 which allows for the venting system 560 to be fluidically connected to one or more deflation ports of a therapeutic cushion system such as those shown in FIGS. 9-10. Optionally, the connection port 566 further includes a check valve 568 which prevents air from traveling back into the deflation ports of the therapeutic cushion system. Operation of the cushion venting system 560 of FIG. 12 is similar to that of the venting system shown and described in FIG. 11.

In another example, a cushion venting system such as those shown in FIGS. 11-12 are adapted for use with a therapeutic cushion system such as shown in FIG. 9. The deflation ports are fluidically connected to the connection port of the venting manifold. Each individual connection includes a check valve to prevent air exiting a deflation port from traveling back into one of the other deflation ports. During deflation air leaves a cushion, passes through the associated deflation port, through the associated check valve and enters the venting manifold where it travels through one or more venting channels of the system until it exits through one or more vents and flows past the body of the user. Optionally, the system may be operated such that a certain volume of air is periodically or constantly being vented from the cushions and through the venting system to maintain a steady flow of air over the user laying on the therapeutic cushions. Such arrangements would allow users to be cooled and/or dried automatically while using the therapeutic cushions.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A therapeutic cushion comprising:

a cushion body including a lower surface, and an upper user-impingement surface formed by a plurality of inflatable risers, and the cushion body further having formed therein at least one fluid port and a plurality of fluid channels fluidly connecting the at least one fluid port to the plurality of inflatable risers;

the plurality of inflatable risers are each elongate in a lateral direction extending between a first lateral cushion edge and a second lateral cushion edge, and form at least one row in a fore-aft direction extending between a forward cushion edge and a back cushion edge;

a plurality of clearances are arranged in alternation with the plurality of inflatable risers, and each of the plurality of inflatable risers has a columnar shape in a vertically extending fore-aft section plane;

wherein the at least one fluid port includes a plurality of inlet/outlet ports, and the plurality of fluid channels includes a plurality of separate fluid channels each fluidly connected to one of the plurality of inlet/outlet ports; and a vent operationally connected to the plurality of inlet/outlet ports such that air exiting the plurality of inflatable risers and passing through the plurality of inlet/outlet ports is vented among the plurality of inflatable risers.

2. The therapeutic cushion of claim 1 wherein the cushion body further includes a base layer having the at least one fluid port formed therein, an inflation layer that includes the plurality of inflatable risers, and a plumbing layer sandwiched between the base layer and the inflation layer and forming the plurality of fluid channels.

3. The therapeutic cushion of claim 2 wherein the plurality of fluid channels are fluidly connected to the plurality of inflatable risers in a zoned arrangement.

4. The therapeutic cushion of claim 3 wherein the zoned arrangement defines a first inflation zone, a second inflation zone, and a middle inflation zone between the first inflation zone and the second inflation zone in the fore-aft direction.

5. The therapeutic cushion of claim 1 wherein each of the inflatable risers includes an internal gusset.

6. The therapeutic cushion of claim 5 wherein each of the internal gussets is oriented fore-aft between a forward wall and a back wall of the respective inflatable riser.

7. A therapeutic cushion system comprising:

a cushion having a cushion body including a lower surface, and an upper user-impingement surface formed by a plurality of inflatable risers;

an inflation/deflation system for the cushion including a manifold having a plurality of inflation ports, a plurality of deflation ports, and a plurality of electrically actuated valves each movable between a first valve configuration and a second valve configuration;

a plurality of inlet check valves each movable from a closed position, to an open position to admit a flow of inflation fluid from a pump to one of the inflation ports;

each of the plurality of electrically actuated valves is movable between a first valve configuration, where one of the plurality of inflatable risers is fluidly connected to one of the plurality of inflation ports and blocked from one of the plurality of deflation ports, and a second valve configuration where the one of the plurality of inflatable risers is fluidly connected to the respective one of the plurality of deflation ports, and is biased toward the first valve configuration; and a venting manifold having a plurality of vents disposed among the plurality of inflatable risers, the venting manifold fluidically connected to the plurality of deflation ports such that air passing through the plurality of deflation ports is vented through the plurality of vents.

8. The therapeutic cushion system of claim 7 wherein each of the plurality of electrically actuated valves includes a three-way, two-position valve.

9. The therapeutic cushion system of claim 7, wherein the system is configured to constantly pass air through the plurality of deflation ports and through the plurality of vents.

10. A therapeutic cushion comprising:

a cushion body including a plurality of inflatable risers, and having formed therein at least one fluid port and a plurality of fluid channels fluidly connecting the at least one fluid port to the plurality of inflatable risers;

the plurality of inflatable risers are each elongate in a lateral direction extending between a first lateral cushion edge and a second lateral cushion edge, and form at least one row in a fore-aft direction extending between a forward cushion edge and a back cushion edge;

a plurality of clearances are arranged in alternation with the plurality of inflatable risers, and each of the plurality of inflatable risers has a columnar shape in a vertically extending fore-aft section plane;

one or more deflation ports fluidically connected to the plurality of inflatable risers;

a vent fluidically connected to the one or more deflation ports to vent expelled air from the one or more deflation ports, through the vent, and between the plurality of inflatable risers.

11. The therapeutic cushion of claim 10, further comprising one or more valves to selectively vent the expelled air.

12. The therapeutic cushion of claim 10 wherein each of the plurality of inflatable risers includes an internal gusset.

13. The therapeutic cushion of claim 10 wherein the vent is formed in a venting manifold.

14. The therapeutic cushion of claim 10 wherein the plurality of inflatable risers are arranged in a left-side series and a right-side series, and the vent is located laterally between the left-side series and the right-side series.

* * * * *